June 29, 1954       A. MUIZA       2,682,110
FEELER GAUGE ASSEMBLY
Filed April 14, 1953
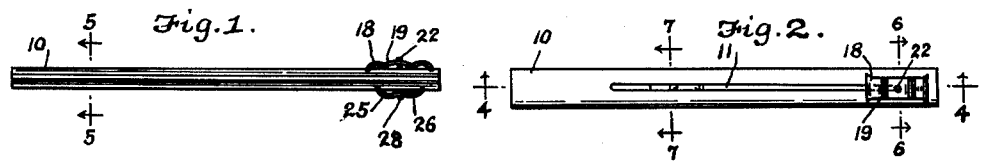
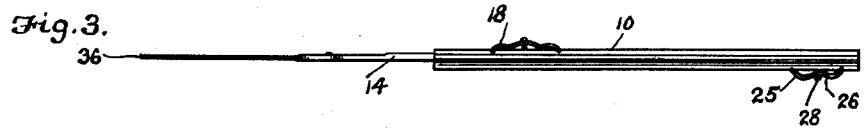
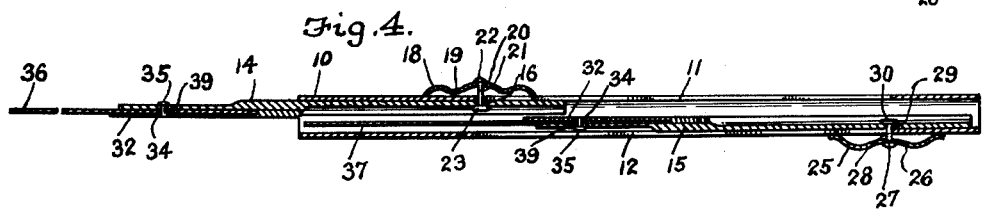
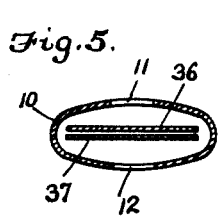
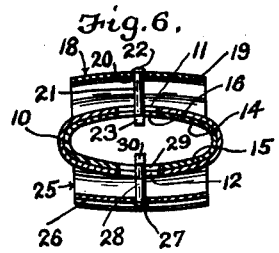
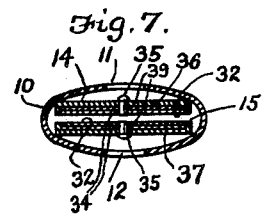
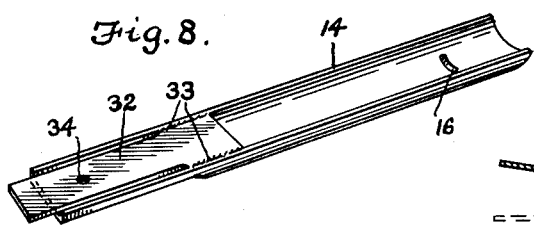
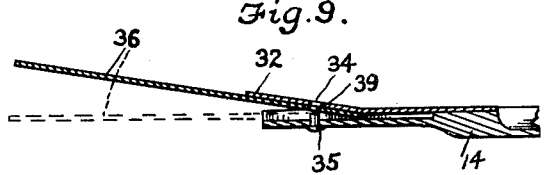
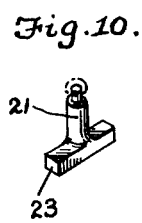
INVENTOR.
Andrejs Muiza
BY
McMorrow, Berman + Davidson
Attorneys.

Patented June 29, 1954

2,682,110

UNITED STATES PATENT OFFICE 2,682,110

FEELER GAUGE ASSEMBLY

Andrejs Muiza, Nashville, Tenn., assignor of one-fourth to Herman L. Trautman and Edward E. Litkenhous Application April 14, 1953, Serial No. 348,633

1 Claim. (Cl. 33—168)

This invention relates to feeler gauge assemblies and more particularly to an assembly including a combined blade handle and receptacle and feeler gauge blades slidably carried by and selectively movable into and out of the handle.

It is among the objects of the invention to provide an improved feeler gauge assembly including an elongated, hollow handle, blade carriers slidably mounted in the handle, and at least two feeler gauge blades of different thicknesses mounted respectively on the blade carriers and selectively movable into and out of the hollow handle; in which the blade carriers are moved by buttons of respectively different shape, so that the gauge blades can be selected by feeling the shape of the buttons with the fingers; in which the blades are detachably connected to the corresponding carriers for changing or replacing the blades, when necessary or desired; which utilizes blades of short length which are inexpensive to replace when damaged or worn; and which is simple and durable in construction, economical to manufacture, easy to use, and neat and attractive in appearance.

Other objects and advantages will become apparent from a consideration of the following description and the appended claims in conjunction with the accompanying drawing wherein:

Figure 1 is a side elevational view of a feeler gauge assembly illustrative of the invention;

Figure 2 is a top plan view of the gauge assembly illustrated in Figure 1;

Figure 3 is a side elevational view similar to Figure 1 with one of the feeler gauges projected from the associated handle;

Figure 4 is a longitudinal cross sectional view on an enlarged scale on the line 4—4 of Figure 2 showing one of the feeler gauge blades projected from the handle, as illustrated in Figure 3;

Figure 5 is a transverse cross sectional view on an enlarged scale on the line 5—5 of Figure 1;

Figure 6 is a transverse cross sectional view on an enlarged scale on the line 6—6 of Figure 2;

Figure 7 is a transverse cross sectional view on an enlarged scale on the line 7—7 of Figure 2;

Figure 8 is a perspective view of a blade carrier constituting an operative component of the assembly;

Figure 9 is a fragmentary, longitudinal cross sectional view of a blade carrier and feeler gauge blade showing the manner of mounting the blades in or removing them from the blade carriers;

Figure 10 is a perspective view of a button connecting pin constituting an operative component of the device; and Figure 11 is a perspective view of a feeler gauge blade constituting an operative component of the device.

With continued reference to the drawing, the feeler gauge assembly includes an elongated, hollow handle 10 of elliptical cross sectional shape having closed slots 11 and 12 extending longitudinally thereof and terminating short of the opposite ends of the handle, the slots being disposed substantially at the opposite ends of the minor axis of the elliptical cross sectional shape of the handle.

Feeler blade carriers 14 and 15 are slidably disposed in the handle 10 and each of these carriers comprises an elongated member of channel shaped cross section having a portion of its outer surface transversely curved to slidably fit the transversely curved inner surface of the corresponding portion of the handle 10. These carriers are disposed in face to face relationship in the handle 10 with their flat faces disposed at respectively opposite sides of a plane including the longitudinal center line of the handle and the major axis of the elliptical cross sectional shape of the handle, and each carrier has a transversely elongated aperture, as indicated at 16, adjacent one end thereof.

A button 18 is disposed on the outer side of the handle 10 in partial covering relationship to the slot 11 and comprises a flat spring extending longitudinally of the handle and longitudinally bowed in a direction away from the adjacent outer surface of the handle, the button 18 having an intermediate portion 19 of outwardly convex shape and being provided medially of its length with an aperture 20.

A pin 21, has at one end, a neck portion extending through the aperture 20 in the button 18 and has a head 22 at the outer side of the button which secures the pin to the button against rotational movements of the pin relative to the button. A crossbar 23 is provided at the opposite end of the pin and extends perpendicularly from the pin to respectively opposite sides thereof, the button 18 and crossbar 23 being both elongated in the same direction. The button 18 is placed on the outer side of the handle over the slot 11, the pin 21 secured to the button 18 is passed through the slot 11, and the crossbar 23 on the pin is passed through the aperture 16 in the blade carrier 14. The button and pin are then rotated through an angle of approximately 90 degrees to position the crossbar 23 transversely of the elongated aperture 16 and thereby lock the pin to the carrier 14, so that the carrier can be moved longitudinally of the handle 10 by moving the button 18 along the slot 11 in the handle.

A second button 25 is disposed at the outer side of the handle in partial covering relationship to the slot 12 and this button also comprises a length of flat spring material longitudinally bowed away from the adjacent surface of the handle and having a concave intermediate portion 26 and an aperture 27 medially of the length thereof. A pin 28, similar to the pin 21, is rigidly secured at one end to the button 25 by having a neck portion thereof engaged in the centrally disposed aperture in the button and this pin has at its other end a crossbar 30. The pin 28 extends through the slot 12 in the handle and the transversely elongated aperture 29 in the blade carrier 15 and has at its end disposed inwardly of the blade carrier a crossbar 30 which engages the blade carrier to releasably lock the button 25 to the blade carrier 15, so that the blade carrier will be moved longitudinally of the handle 10 when the button 25 is moved along the slot 12. The spring buttons 18 and 25 maintain the corresponding blade carriers in firm sliding engagement with the adjacent portions of the inner surface of the handle 10, and the convex shape of the intermediate portion of one of the buttons and the concave shape of the intermediate portion of the other button provides means by which the buttons can be distinguished from each other by merely feeling the buttons with the fingers without having to move the feeler gauge assembly away from the work for visual inspection of the buttons for the associated feeler gauge blades.

A flat spring 32 is disposed in the channel shaped carrier head 14 near the end of the carrier remote from the aperture 16 and is disposed adjacent and parallel to the inner surface of the web portion of the channel shaped carrier. The spring is rigidly secured at its inner end to the inner sides of the flanges of the carrier, as indicated at 33, and projects at its outer end beyond the adjacent end of the carrier. Near the adjacent end of the carrier the spring 32 is provided with an aperture 34 medially of the width thereof, and a pin 35 is secured in an aperture in the web portion of the carrier 14 and projects through the aperture 34 in the spring 32.

The feeler gauge blades 36 and 37 may be of a type now available on the market, and as particularly illustrated in the case of the blade 36 in Figure 11, comprise flat springs having straight and parallel side edges and flat side faces ground to provide the exact desired thickness of the blade. Each blade is preferably provided with one arcuately rounded end, as indicated at 38, and is provided near its other end with an aperture 39 disposed medially of its width and the width of the blade is substantially equal to the distance between the inner surfaces of the flanges of the blade carriers 14 and 15.

In order to place a gauge blade in a blade carrier, the end of the blade adjacent the aperture 39 therein is inserted under the projecting end of the spring 32, the spring is raised away from the adjacent end of the carrier and the end of the blade forced between the spring and the carrier until the aperture 39 in the blade registers with the pin 35. The blade is then released to seat between the flanges of the carrier and the spring forces the blade against the inner surface of the web portion of the carrier with the pin projecting through the aperture 39 in the blade and the aperture 34 in the spring. The blade is thus firmly, but releasably locked in the carrier, and it can be removed in an obvious manner, when it is desired to change blades or to replace a worn or damaged blade.

The above described assembly is particularly useful in setting the valves of motor vehicle engines and when used for this purpose, will carry two gauge blades of slightly different thicknesses, one for setting the intake valves, and the other for setting the exhaust valves of an engine. As manufacturers' specifications for engines of different manufacture vary somewhat in the valve tappet clearance, blades would be provided complying with the various specifications and the proper blades selected and inserted in the blade holders for the particular engine being adjusted. In practically all cases there is, however, a slight difference in the clearance of the intake and exhaust valves and thus, two gauge blades of slightly different thickness will be required for setting the engine valves. The device is of light weight and conveniently small size to be easily held in the hand of a mechanic using the gauge, but the length of the assembly is sufficient, when one of the gauge blades is projected out of the handle, to permit the mechanic to conveniently use the gauge to check the valve settings without placing his arms or hands sufficiently close to the exhaust manifold of the engine to receive burns in the event the exhaust manifold is hot at the time the valves are being adjusted.

When the blades are retracted into the handle they are fully protected from damage and the assembly with the blades retracted can be carried in a tool box with other tools without any danger to the gauge blades.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

A feeler gauge assembly comprising an elongated tubular handle having spaced apart slots extending longitudinally thereof and terminating short of the end of said handle, blade carriers slidably mounted in said handle in face to face relationship to each other for independent movement longitudinally of the handle, buttons disposed at the outside of said handle each button guided by an adjacent slot and connected to an adjacent carrier for moving said carrier longitudinally of said handle, and feeler gauge blades connected one to each of said blade carriers, each blade being detachably connected at one end to the corresponding carrier at one end of the latter and extending longitudinally from the corresponding carrier for movement into and out of said handle upon movement of the corresponding carrier longitudinally of said handle by the associated button, each of said carriers comprising a body of channel shaped cross section receiving the associated feeler gauge blade between the flanges thereof, a flat spring secured at one end to the channel shaped body at a location spaced from said one end of the carrier body and resiliently pressing the associated blade against the inner surface of the web portion of the body, and a pin extending through registering apertures in the web portion of the body, the feeler gauge blade and the flat spring, releasably locking said blade in fixed position relative to the associated blade carrier.

References Cited in the file of this patent

UNITED STATES PATENTS

| Number | Name | Date |
|---|---|---|
| 1,652,047 | Di Rebaylio | Dec. 6, 1927 |
| 2,439,363 | Habicht | Apr. 6, 1948 |
| 2,558,965 | Koenig | July 3, 1951 |